No. 822,705. PATENTED JUNE 5, 1906.
C. H. WILSON.
PIPE OR CONDUIT.
APPLICATION FILED SEPT. 29, 1905.
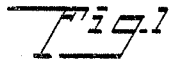
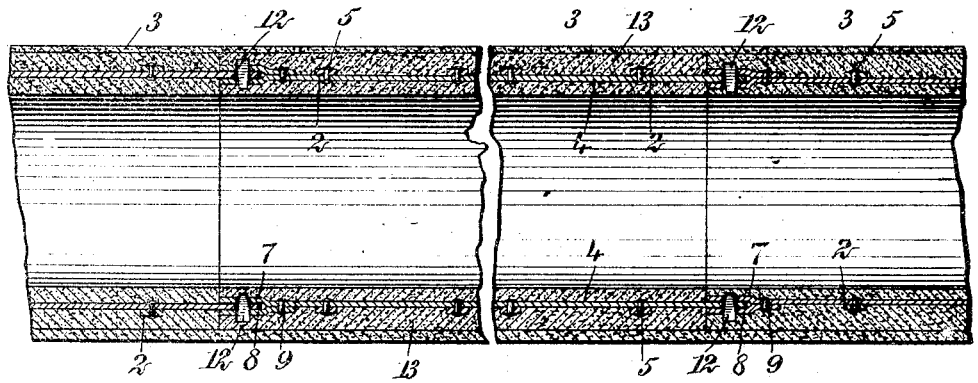
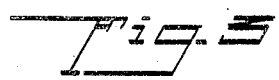 
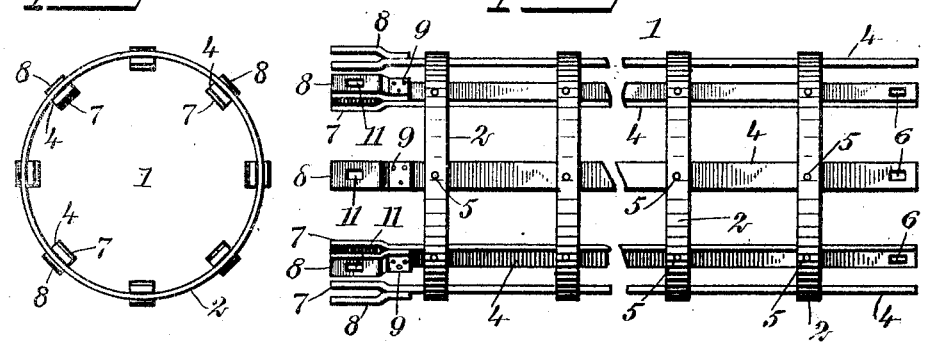
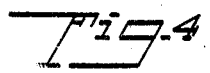
WITNESSES:
INVENTOR
Charles Harrison Wilson
BY
ATTORNEYS

UNITED STATES PATENT OFFICE.

CHARLES HARRISON WILSON, OF RED OAK, IOWA.

PIPE OR CONDUIT.

No. 822,705.

Specification of Letters Patent.

Patented June 5, 1906.

Application filed September 29, 1905. Serial No. 280,618.

*To all whom it may concern:*

Be it known that I, CHARLES HARRISON WILSON, a citizen of the United States, and a resident of Red Oak, in the county of Montgomery and State of Iowa, have invented a new and Improved Pipe or Conduit, of which the following is a full, clear, and exact description.

This invention relates to pipes or conduits; and it consists, substantially, in the details of construction and combinations of parts hereinafter more particularly described, and pointed out in the claims.

The invention has reference more especially to pipes or conduits for the conveyance of water or other fluid and of the kind technically designated as "composition," though comprising metallic elements in the construction thereof.

The object of my invention is to provide a pipe or conduit of this kind which is simple in construction and comparatively inexpensive to manufacture, besides being strong and durable, effective and reliable for its purposes, and possessing the capacity for long and repeated service.

The above and additional objects are attained by means substantially such as are illustrated in the accompanying drawings, in which—

Figure 1 is a broken longitudinal sectional view of a composition pipe or conduit embodying my improvements. Fig. 2 is a side view of a metallic skeleton or frame employed in the structure. Fig. 3 is an end view of the construction shown in Fig. 2, and Fig. 4 is a view in perspective of one of the wedges employed for fastening together the adjacent ends of successive sections of the pipe or conduit.

Before proceeding with a more detailed description it may be stated that in the form of my improvements herein shown I employ a pipe or conduit comprising a metallic skeleton or frame of special construction, around which is applied or molded concrete or other composite material of which the structure may be formed, the said metallic skeleton or frame becoming thereby embedded within such material. In the manufacture of the sections of which the pipe or conduit is constructed portions of certain members of the metallic skeleton or frame of each section are left uncovered or free of the composite material at the ends of the section, thereby enabling the adjacent ends of the successive sections to be coupled or united together, as will presently be explained, after which further composite material may be applied to the joints between the sections in the completion of my improved pipe or conduit.

Reference being had to the drawings by the designating characters thereon, 1 represents in entirety a metallic skeleton or frame employed in the construction of my improved composition pipe or conduit, said skeleton or frame comprising a plurality of rings or circumferentially-disposed members 2 for each section 3 of the pipe or conduit, the same being located at suitable intervals from each other throughout the section, as shown, and being connected by strips or longitudinally-disposed members 4, suitable pins, rivets, or other devices 5 being employed for fastening together the said members 2 and 4. The strips or longitudinally-disposed members 4 are located at suitable intervals from each other circumferentially of the pipe or conduit section, and each of the same is formed at one of its ends with preferably a rectangular opening or slot 6, while the other end thereof is bent or offset for a suitable proportion of the length of the strip or member, thus to form what may be termed a "jaw" 7, opposite to which is disposed another jaw 8, constructed of a separate piece of metal secured to the strip or member 4 by means of pins or rivets 9 or in any other suitable way and being bent or offset oppositely to the jaw 7, thus to form a space between the two jaws of sufficient width to enable the opposite end of the corresponding strip or longitudinally-disposed member 4 of another section of pipe or conduit to be received between the jaws. The jaws 7 and 8 of each pair are formed with corresponding rectangular openings or slots 11, and when the successive sections of the pipe or conduit are properly associated with each other the ends of the strips or longitudinally-disposed members 4, having therein the openings or slots 6, will be received between the jaws 7 and 8 of the next adjacent section of pipe or conduit, and the said openings or slots 6 being brought into registery with the corresponding openings or slots 11 in the jaws 7 and 8 a suitable wedge 12 is inserted and driven through each of the sets of registering openings or slots referred to, thereby uniting the skeleton or frame of the pipe or conduit in an obvious manner.

It will be understood, of course, that each section of my improved pipe or conduit is separately constructed, concrete or other composite material 13 being applied to or molded around the skeleton or frame of the section of the structure, leaving the ends of the strips or longitudinally-disposed members 4 free, so as to enable the coupling together of successive sections of the pipe or conduit in the manner just above explained. In this way when long lines of the pipe or conduit are to be formed it is apparent that the naked coupled portions of the strips or longitudinally-disposed members 4 of the successive skeletons or frames at the joints of the sections have applied thereto either concrete or other composite material to complete the structure.

I thus derive a pipe or conduit of the character specified which is capable of withstanding enormous internal and external pressure and which is reinforced throughout the entire length thereof in such manner as to adapt the structure for use either as a culvert or drain-pipe, as well as for other purposes.

Having thus described my invention, I claim as new and desire to secure by Letters Patent—

1. A conduit comprising sections of composition material, having metallic frames embedded therein, embodying longitudinal members constructed at one of their ends with slots and provided at their other ends with jaws having opposite slots therein, registering with said first-named slots, and wedges driven into each set of registering slots for securing said sections together.

2. A conduit comprising sections of composition material, having metallic structures embedded therein, said structures comprising spaced circumferentially-disposed members, and longitudinally-disposed members connected to the circumferentially-disposed members, said longitudinally-disposed members having at one end a longitudinal slot, and at the other jaws spaced radially from each other for receiving the opposite end of the corresponding member of the preceding section, each of said jaws having a longitudinal slot, and a wedge traversing the alined slots, whereby to secure the structures together.

3. A conduit comprising sections of composition material, having metallic frames embedded therein, said frames comprising longitudinal members having at one end a slot and at the other end radially-spaced jaws each provided with a slot and adapted to receive therebetween the opposite end of the corresponding longitudinal member of the preceding section, and wedges traversing the slots for retaining the parts in position.

In testimony whereof I have signed my name to this specification in the presence of two subscribing witnesses.

CHARLES HARRISON WILSON.

Witnesses:
J. F. MILLER,
E. N. KERRIBARD.